United States Patent [19]

Rampel

[11] 4,245,016

[45] Jan. 13, 1981

[54] ELECTRODE COATING COMPOSED OF COPOLYMERS DERIVED FROM DIACETONE ACRYLAMIDE

[75] Inventor: Guy Rampel, Gainesville, Fla.

[73] Assignee: General Electric Company, Gainesville, Fla.

[21] Appl. No.: 966,745

[22] Filed: Dec. 5, 1978

[51] Int. Cl.$^3$ .............................................. H01M 4/62
[52] U.S. Cl. ................................... 429/216; 429/217; 429/229; 429/232
[58] Field of Search ............... 429/215, 216, 217, 209, 429/127, 229–232

[56] References Cited

U.S. PATENT DOCUMENTS

| | | | |
|---|---|---|---|
| 2,738,375 | 3/1956 | Schlotter | 429/217 |
| 2,824,165 | 2/1958 | Marsal | 429/217 |
| 3,630,781 | 12/1971 | Rampel | 427/126 |
| 3,877,986 | 4/1975 | Catherino | 429/217 |
| 3,918,989 | 11/1975 | Gillman et al. | 429/215 X |
| 3,954,501 | 5/1976 | Rampel | 429/212 |
| 4,004,944 | 1/1977 | Sandera et al. | 429/215 |

OTHER PUBLICATIONS

Lubrizol Technical Literature on 2-Acrylamido-2-methyl-propanesulfonic Acid (AMPS) monomer.
Encyclopedia of Polymer Science and Technology, 1971, vol. 15, pp. 353–364.

*Primary Examiner*—Anthony Skapars
*Attorney, Agent, or Firm*—Morgan, Finnegan, Pine, Foley & Lee

[57] ABSTRACT

An improved electrode coating and separator coating derived from a copolymer of diacetone acrylamide and a polymerizable monomer.

This invention relates to novel rechargeable electrodes, separators and processes for preparing same.

5 Claims, No Drawings

ELECTRODE COATING COMPOSED OF COPOLYMERS DERIVED FROM DIACETONE ACRYLAMIDE

BACKGROUND OF THE INVENTION

Linear fluorocarbon polymers have been extensively utilized as binders and wet proofing agents in cell electrodes having finely divided active material. According to a typical electrode forming technique a fluorocarbon polymer may be incorporated in a cell plate by mixing the polymer with a particulate active material to form an aqueous paste. Since fluorocarbons are hydrophobic, this is accomplished by first dispersing the fluorocarbon in an aqueous solution containing a minor amount of a surface active agent, usually less than 5 percent by weight. The surfactant allows the polymer to be uniformly dispersed in the water, so that in the pasty mixture of water, surfactant, active material particles, and polymer, the latter is uniformly distributed. The aqueous paste is spread onto a current collector or other support usually with a doctor blade or be calendering so that the paste is uniformly distributed over the desired active area of the cell plate.

While teflonated materials as described above have been found to be adequate, it is found that for electrodes comprised of zinc or cadmium, certain deficiencies are encountered which are alleviated by the binder defined herein.

SUMMARY OF THE INVENTION

The present invention relates to improved electrodes, particularly those comprised of zinc or cadmium, in which the electrode binder or electrode coating contains a copolymer derived from diacetone acrylamide and a polymerizable monomer such as acrylic acid or 2-acrylamide-2-methylpropanesulfonic acid.

It has been found that electrodes as described herein are characterized by binder properties such as stability to potassium hydroxide, low electrical resistance, efficiency at minimal concentrations, effective bonding and mechanical stability and special beneficial properties associated with zinc electrodes such as agglomeration and shape change retardation, dendritic growth retardation and resistance to change of growth morphology, such properties not found in prior art electrode binders and coatings.

It is surprisingly found that the use of the binder and coating material described herein result in the highly beneficial properties described above.

This invention is also concerned with the method of preparing the highly advantageous electrodes and separators defined and claimed herein.

DETAILED DESCRIPTION OF THE INVENTION

This invention is directed to improved electrodes comprising an electrode binder or coating containing a copolymer derived from a diacetone acrylamide and a polymerizable monomer, the latter preferably containing a carboxyl group in order to enhance ionic conductivity of the resultant polymer.

Diacetone acrylamide DAA or as more commonly called N-(1,1-dimethyl-3-oxbutyl) acrylamide is a monomer which has the formula:

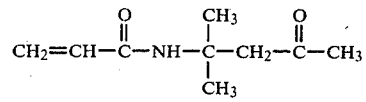

It is highly reactive and has good solubility characteristics.

DAA copolymerizes readily with a wide variety of monomers such as acrylic acid, 2-acrylamide-2-methylpropane-sulfonic acid, styrene, methyl methacrylate, vinyl acetate, vinyl chloride, maleic anhydride, vinyl stearate, ethyl vinyl ether, N-vinylpyrrolidone, vinylidene chloride, acrylonitrile, methyl vinyl ketone, methacrylic acid, acrylamide and butadiene.

A preferred copolymer for purposes of this invention is that which is prepared from DAA and acrylic acid. This particular polymer is prepared by combining the reactants in a water solution containing a trace amount of ascorbic acid followed by a nitrogen purge and addition of hydrogen peroxide to initiate the polymerization. The product is freed of impurities and then dissolved in alkali hydroxide. The product, a linear, high molecular weight copolymer of diacetone acrylamide and acrylic acid in an approximate molecular ratio of 1 to 0.4 is preferred and provides the beneficial properties described above.

Similarly, other copolymers of DAA using the polymerizable monomers listed above are prepared in a similar manner to give corresponding products.

The use of these materials as electrode binders is accomplished by the usual methods.

For example, an aqueous paste or mixture is prepared composed of said copolymer and usually a particulate rechargeable active material and is spread onto a conventional current collector or other support by well understood techniques. Usually the paste is spread with a doctor blade or by calendering so that the paste is uniformly distributed over the desired active area of the cell plate. Typically expanded metal, woven screens, or porous plaques of electronically conductive material are utilized to support and collect current from the active material paste. Once the paste is spread onto the plate, it is held in position by the fibrous interconnecting matrix represented by the polymeric binder. It is immaterial whether the paste contains water or not at the time it is spread onto the current collector or support.

Other preferred copolymers are those prepared from DAA and methacrylic acid and 2-acrylamide-2-methylpropane-sulfonic acid.

In forming coatings for electrodes or separators, a paste or aqueous mixture is applied as a coating over the electrode or separator material or may be cast to form films to be used as separator per se.

When used as a binder or coating for electrodes, the amount of copolymer is from 0.5 to 5% by weight based on the amount of copolymer and active material.

For separator coating purposes, the amount of copolymer is preferably from 0.5 to 20% by weight of the separator material.

EXAMPLE 1

A typical zinc electrode is made by mixing together the following composition with water in sufficient amount to make a pasteable electrode then applying same to a conductive substrate such as silver, iron or copper:

2.05 gms powdered zinc
8.20 gms zinc oxide
0.03 gms of mercury oxide
0.21 gms of DAA/acrylic acid polymer (sodium form).

After drying the electrode can be wound of flexed without lossing active material from the substrate. The above zinc electrodes were used to make a nickel-zinc cell which was useful in high current applications at currents of up to 20 times the capacity of rating of the cell.

EXAMPLE 2

Battery separator such as nylon was impregnated with 8% DAA/Acrylic 1/0.4 mol ratio sodium salt polymer. Nickel-zinc cells cycled longer than controls. The coating effectively retarded zinc dentrite growth through the separator.

Although the above examples have shown various modifications of the present invention, other variations are possible in light of the above teachings. It is, therefore, to be understood that changes may be made in the particular embodiments of the invention described which are within the full intended scope of the invention as defined by the appended claims.

What is claimed is:

1. In a zinc electrode, the improvement comprising an electrode coating consisting essentially of a copolymer derived from diacetone acrylamide and a polymerizable monomer selected from acrylic acid or methacrylic acid; and a finely divided active zinc electrode material.

2. The electrode of claim 1 wherein said copolymer is a linear, high molecular weight copolymer derived from diacetone acrylamide and acrylic acid, the molecular weight ratio of said monomers being about 1 to about 0.5, respectively.

3. The electrode of claim 1 wherein said copolymer is a linear, high molecular weight copolymer derived from diacetone acrylamide and methacrylic acid.

4. The zinc electrode of claim 1 wherein said copolymer comprises from about 0.5 to about 5% by weight of said coating.

5. The zinc electrode of claim 1 wherein said electrode coating is coated in an amount of from 1 to about 5% by weight of said electrode.

* * * * *